United States Patent
Patti

(10) Patent No.: US 10,434,693 B2
(45) Date of Patent: Oct. 8, 2019

(54) OVERMOLDING METHOD FOR MAKING THERMOPLASTICS ARTICLES OF MANUFACTURE, IN PARTICULAR FOR THE PERFUMERY AND COSMETICS FIELDS

(71) Applicant: MATIC PLAST MILANO S.R.L., Milan (IT)

(72) Inventor: Giovanni Patti, Milan (IT)

(73) Assignee: MATIC PLAST MILANO S.R.L., Milan (IT)

(*) Notice: Subject to any disclaimer, the term of this patent is extended or adjusted under 35 U.S.C. 154(b) by 277 days.

(21) Appl. No.: 15/074,903

(22) Filed: Mar. 18, 2016

(65) Prior Publication Data
US 2017/0113383 A1    Apr. 27, 2017

(30) Foreign Application Priority Data
Oct. 26, 2015   (IT) .......................... 102015000065424

(51) Int. Cl.
*B29C 45/00* (2006.01)
*B29C 45/14* (2006.01)
(Continued)

(52) U.S. Cl.
CPC .......... *B29C 45/0005* (2013.01); *B29C 45/14* (2013.01); *B29C 45/14688* (2013.01);
(Continued)

(58) Field of Classification Search
CPC .................. B29C 2063/485; B29C 2045/1673
(Continued)

(56) References Cited

U.S. PATENT DOCUMENTS

| | | | | |
|---|---|---|---|---|
| 4,495,125 A | * | 1/1985 | Hatakeyama | .......... A45D 34/00 264/132 |
| 5,519,094 A | * | 5/1996 | Tseng | ...................... C08L 67/02 524/539 |

(Continued)

OTHER PUBLICATIONS

Nanomold Coating. "5 Major Advantages to Using Plastic Injection Molding for the Manufacturing of Parts." Available Sep. 11, 2014.*
(Continued)

*Primary Examiner* — Matthew J Daniels
*Assistant Examiner* — Hana C Page
(74) *Attorney, Agent, or Firm* — Hedman & Costigan, P.C.; James V. Costigan; Kathleen A. Costigan

(57) ABSTRACT

An overmolding method for making thermoplastics articles of manufacture, for the perfumery and cosmetics fields, comprises the steps of:
a) providing a first plastics material in a form suitable for an injection molding;
b) providing an injection press, and molding by the injection press the first plastics material thereby providing a raw molded article of manufacture;
c) associating with the raw article of manufacture made in said molding step:
d) at least an insert element of a material different from the plastics material thereby providing an assembly of the raw molded article of manufacture and the insert element; and
e) overmolding on the assembly at least a second plastics material thereby providing a finished molded article of manufacture.

5 Claims, 5 Drawing Sheets

(51) Int. Cl.
*B29C 45/16* (2006.01)
*B29K 23/00* (2006.01)
*B29L 31/00* (2006.01)
*B29L 31/56* (2006.01)

(52) U.S. Cl.
CPC ............... *B29C 45/1671* (2013.01); *B29C 2045/14696* (2013.01); *B29C 2045/1673* (2013.01); *B29K 2023/08* (2013.01); *B29L 2031/56* (2013.01); *B29L 2031/718* (2013.01)

(58) Field of Classification Search
USPC .......................................................... 264/257
See application file for complete search history.

(56) References Cited

U.S. PATENT DOCUMENTS

| | | | | |
|---|---|---|---|---|
| 6,565,012 | B1* | 5/2003 | Zaragoza | A61L 9/12 237/57 |
| 8,062,736 | B1* | 11/2011 | Coolong | B29C 45/14811 264/129 |
| 2002/0106952 | A1* | 8/2002 | Hashizume | B29C 45/14221 442/43 |
| 2010/0244318 | A1* | 9/2010 | Kobayashi | B29C 45/14073 264/279 |
| 2014/0322506 | A1* | 10/2014 | Jang | D06N 3/0002 428/215 |
| 2018/0370096 | A1* | 12/2018 | Fuchs | B29C 43/184 |

OTHER PUBLICATIONS

"Surlyn PC-2200 Injection Molding Resin." <http://www.dupont.com/products-and-services/plastics-polymers-resins/ethylene-copolymers/brands/surlyn-ionomer-resin/products/molding-resin-cos> (Available Oct. 16, 2015). (Year: 2015).*

DuPont Surlyn® Offers Outstanding Clarity for "FlowerbyKenzo essentielle" Perfume Cap. <http://www.dupont.com/products-and-services/packaging-materials-solutions/cosmetic-containers/case-studies/flowerbyKenzo-essentialle-perfume-cap.html> (Year: 2015).*

"A Glass-Like Molding Resin that Expands Design Possibilities" <http://www.dupont.com/products-and-services/plastics-polymers-resins/ethylene-copolymers/brands/surlyn-ionomer-resin/products/molding-resin-cosmetics.html> Available Oct. 16, 2015. (Year: 2015).*

* cited by examiner

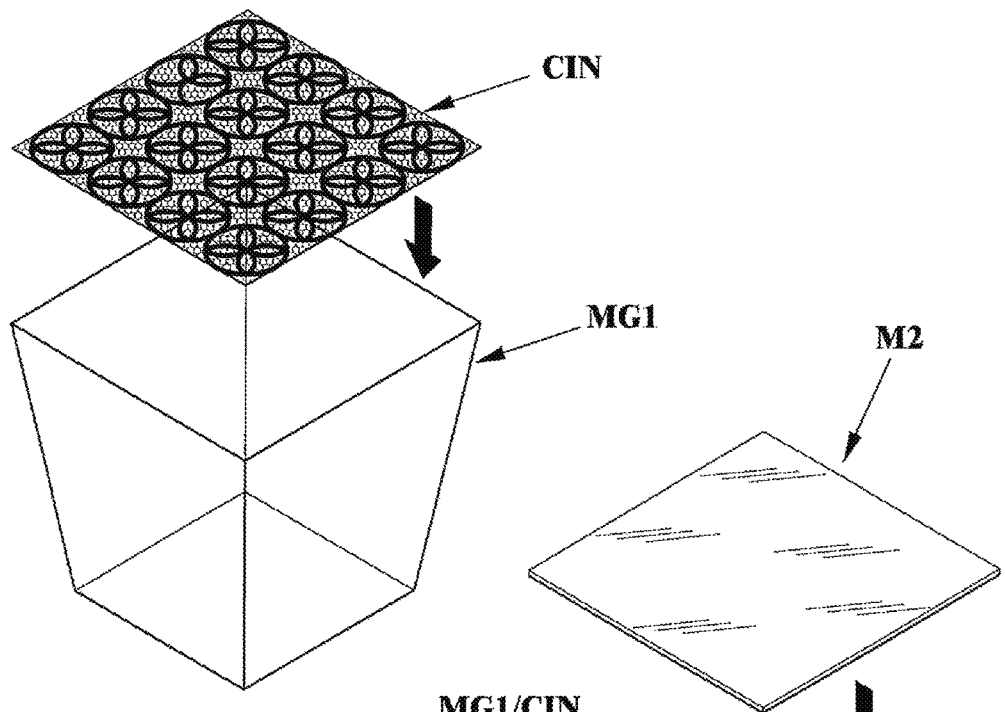
FIG. 6
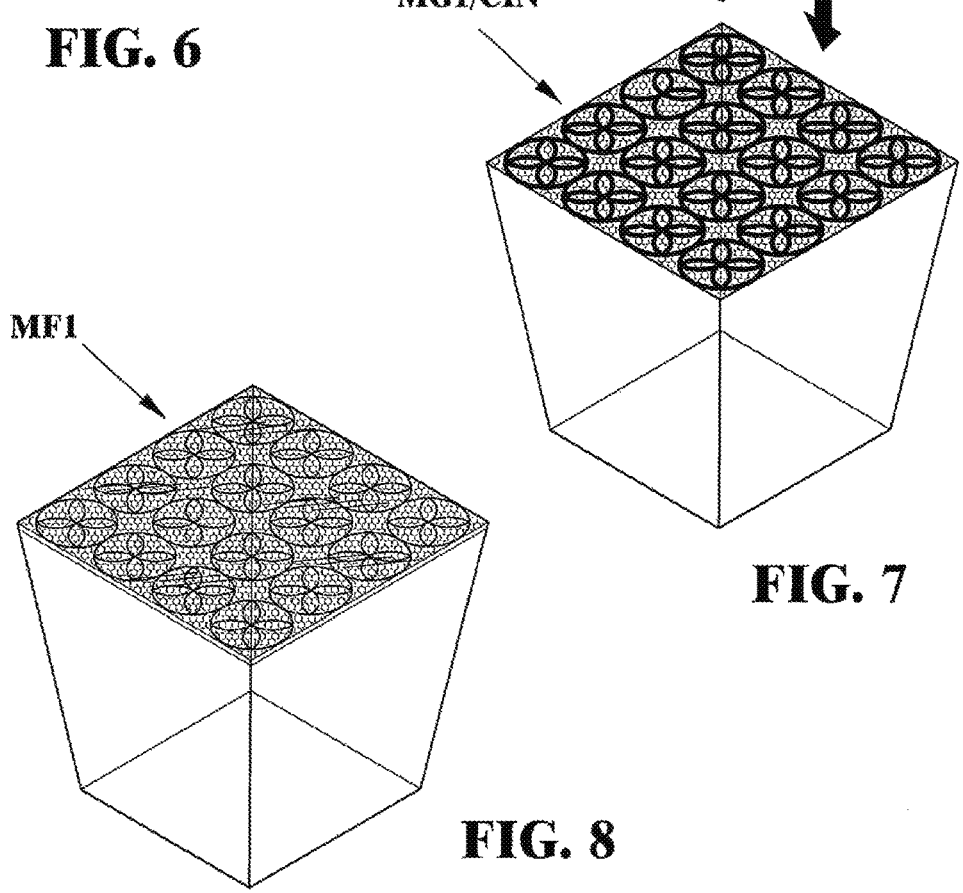
FIG. 7
FIG. 8

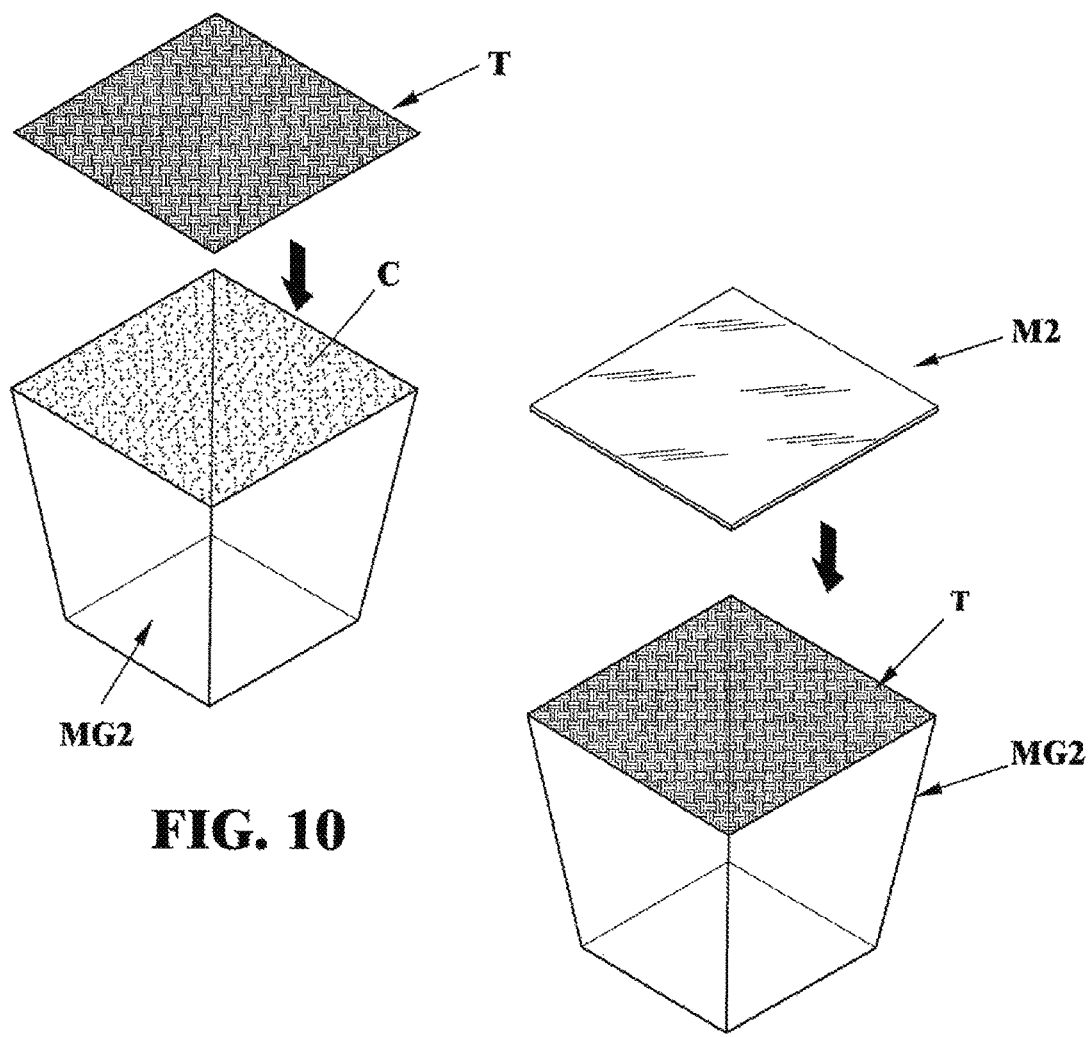
FIG. 10
FIG. 11
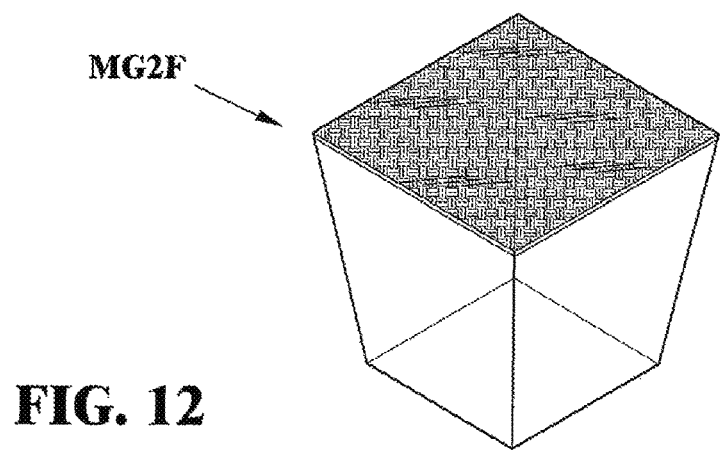
FIG. 12

OVERMOLDING METHOD FOR MAKING THERMOPLASTICS ARTICLES OF MANUFACTURE, IN PARTICULAR FOR THE PERFUMERY AND COSMETICS FIELDS

BACKGROUND OF THE INVENTION

The present invention relates to an overmolding method for making thermoplastics articles of manufacture, in particular for the perfumery and cosmetics fields.

A very important problem in the perfumery and cosmetics fields is that of making articles of manufacture, for example perfume vessel plugs, having a comparatively large thickness, by molding, usually by injecting molding suitable plastics materials.

At present, this problem is solved, for example, by the so-called overmolding process, including a first molding step, for example by an injection press, of the first plastics material, and a second molding step consisting of "overmolding" on the raw object or article of manufacture molded in the first step a second plastics material which may be identical to or different from the first plastics material.

The second overmolded plastics material may be different from the first plastics material, provided that they are compatible with one another.

The prior overmolding process allows to provide an aesthetically acceptable finished article of manufacture having a size and weight larger than those made by a so-called "single step" injection process.

The prior overmolding process, however, is affected by great drawbacks which do not allow to achieve a very accurate adjustment of the plastics material injection press.

A further drawback of the prior overmolding process or method is that, although it provides, as mentioned, an aesthetically acceptable article of manufacture, the aesthetic characteristics of the latter are due only to particular colors and thermoplastics material types, and accordingly would be susceptible to further improvements, for example by using or including other materials, such as metal and fabric materials, even of a precious type.

SUMMARY OF THE INVENTION

Thus, in view of the above and other drawbacks of prior methods for overmolding plastics materials, in particular for making articles in the cosmetics and perfumery fields, the aim of the present invention is to provide a novel plastics material overmolding method, for the mentioned perfumery and cosmetics fields, allowing to make finished articles of manufacture with a comparatively large thickness, while overcoming any risk of defects such as shrinking and collapsing of the plastics material being molded.

Within the scope of the above mentioned aim, a main object of the invention is to provide such an overmolding method which allows to make overmolded articles of manufacture having very good and also novel aesthetic features built therein.

Another object of the present invention is to provide such an overmolding method which may be carried out on commercially available plastics material molding and overmolding apparatus, without requiring any substantial modifications thereof.

Yet another object of the present invention is to provide such an overmolding method which may use conventional thermoplastics materials currently used in the cosmetics and perfumery field, without a need of modifying their structural formulas and parameters.

Yet another object of the present invention is to provide such an overmolding method which may be fully and very easily industrially implemented.

According to one aspect of the present invention, the above mentioned aim and objects, as well as yet other objects, which will become more apparent hereinafter, are achieved by an overmolding method for making thermoplastics articles of manufacture, in particular for the perfumery and cosmetics field, having the characterizing feature of the main claim.

Further characteristics of the inventive method are set out in the dependent claims.

BRIEF DESCRIPTION OF THE DRAWINGS

Further details and advantages of the overmolding method according to the present invention will become more apparent hereinafter from the following detailed disclosure of some preferred embodiments of the inventive method, which are illustrated, by way of an indicative but not limitative example, in the accompanying schematic drawings, where:

FIGS. 2 to 8 are further schematic views of the steps of the inventive method shown in the block diagram of FIG. 1;

FIGS. 10 to 12 schematically show the overmolding steps of the method shown in the block diagram of FIG. 9.

DESCRIPTION OF THE PREFERRED EMBODIMENTS

As stated, the present invention relates to a novel method for overmolding plastics material, which has been specifically designed for the perfumery and cosmetics filed, and provides to overmold, on a plastics material article already molded, or the so-called raw article of manufacture, a further plastics material, for example of the same kind and type as the first one, or different from it, by coupling in the article at least an insert of a material different from a plastics material, such as a fabric or metal material.

As stated, the raw material and the overmolded material should be selected so as to be chemically compatible with one another.

More specifically, the inventive overmolding method comprises the following method steps:

1) Molding, for example by injection, a so-called raw article of manufacture, made of a plastics material of a "SURLYN®" type which is a polymer made from ethylene acid copolymers, in which the acid groups are partially neutralized with either zinc or sodium ions.

2) Inserting into the raw article of manufacture thus made a material different from a plastics material, such as, for example, a fabric or metal insert.

3) Overmolding on the mentioned raw article of manufacture, with the insert applied, a further plastics material, also preferably of the "SURLYN®" type, thereby providing a finished article of manufacture.

Figure 1:
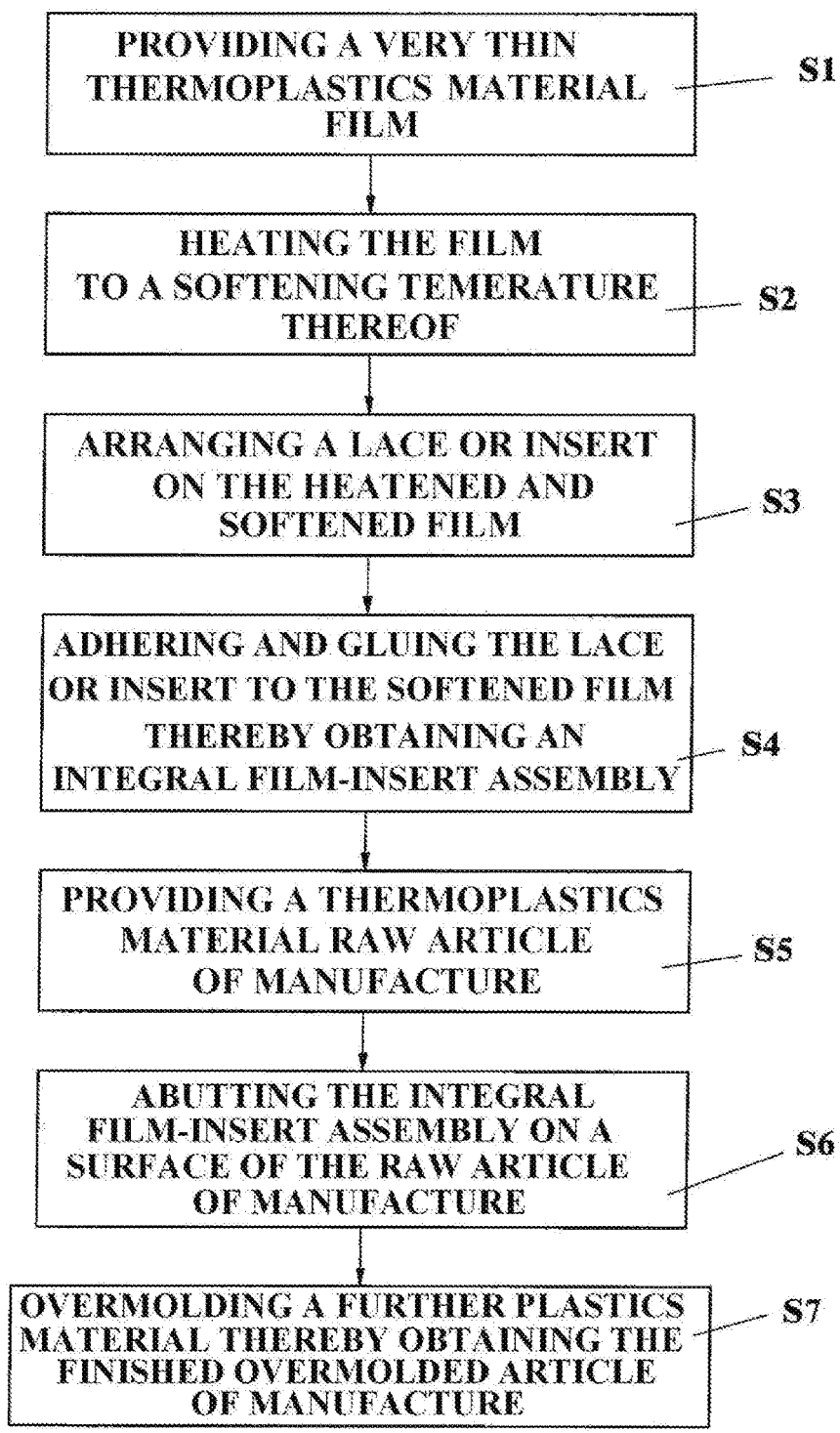
FIG. 1 is a block diagram showing a possible embodiment of the method according to the present invention, in which, in the overmolding step, a lace element is arranged between the overmolded plastics materials.

More specifically, with reference to the above mentioned figures and, in particular, to FIG. 1, a first preferred embodiment of the method according to the present invention comprises a method step S1 of providing a very thin film of a thermoplastics material, for example, as stated, the mentioned "SURLYN®" material.

In a following method step S2, the "SURLYN®" film is heated to a softening temperature thereof.

Then, in a further following method step S3, on the heated and softened film an insert, for example a lace, is arranged.

In yet a further method step S4, said lace or insert is caused to adhere to or be embedded in the softened film to provide an integral film-insert assembly.

In yet a further method step S5, the method comprises providing a thermoplastics material raw article of manufacture, for example of the mentioned "SURLYN®" material.

In yet a further method step S6, the integral film-insert assembly is abutted on a surface of the raw article of manufacture.

Finally, in an end method step S7, a further thermoplastics material is overmolded on the mentioned integral film-insert assembly, thereby providing the desired finished overmolded article of manufacture.

In other words, the last method step S7 consists of overmolding on the raw article of manufacture, with the film-insert already glued on it, a further plastics material by the injection molding process.

In actual practice, the base article of manufacture is fully coated on all the sides thereof with a further plastics material.

The above disclosed method steps have been also schematically shown in the corresponding perspective views of FIGS. 2 to 8.

Figure 2:
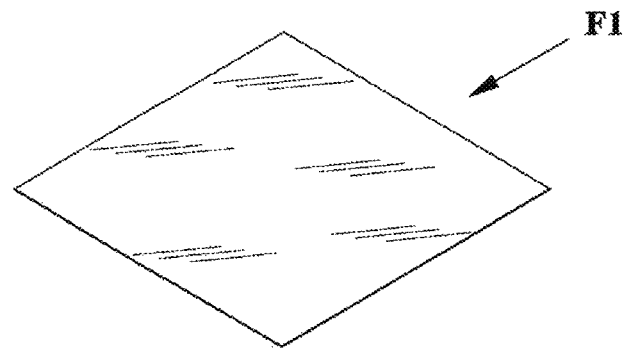

More specifically, in FIG. 2 a thin thermoplastics material film F1 is provided.

Figure 3:
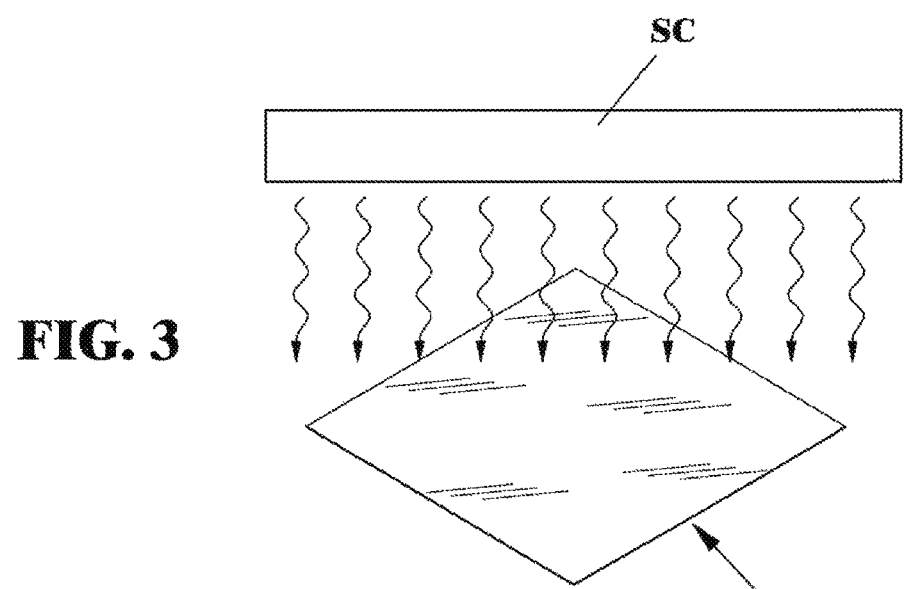

In FIG. 3, the thin thermoplastics material film F1 is heated and softened by a heat source SC to a preset softening temperature.

Figure 4:
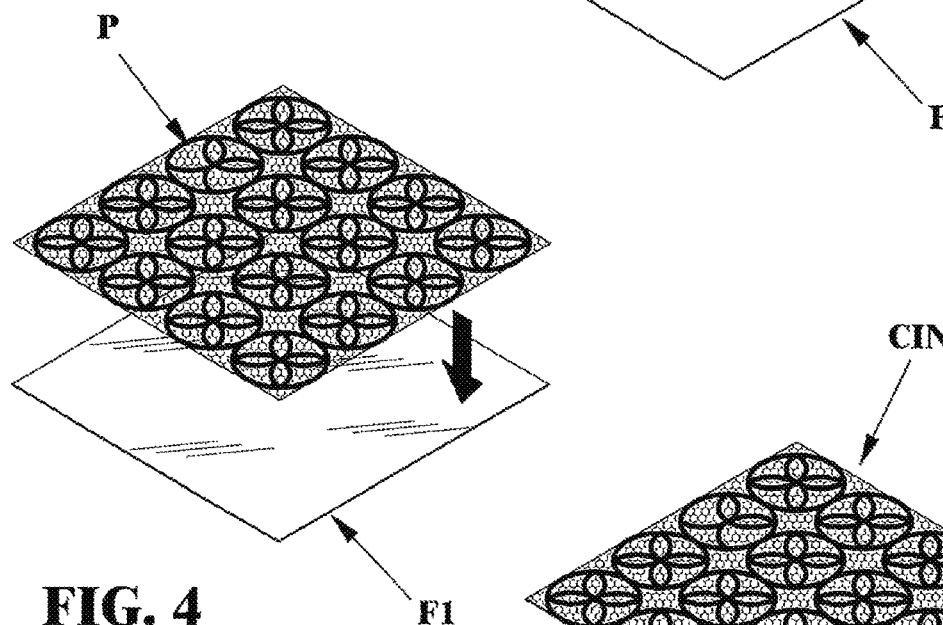

In FIG. 4, on the heated and softened film F1 an insert, for example a lace P, is overlapped.

Figure 5:
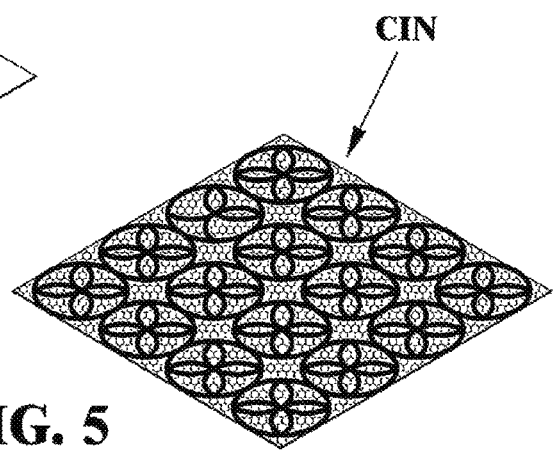

In FIG. 5, the lace insert P and the softened film F1 are caused to adhere to one another, thereby providing an insert assembly CIN.

In FIG. 6 a raw article of manufacture MG1 is provided, for example of the above mentioned "SURLYN®" material, and on a surface thereof the insert assembly CIN, including the lace P embedded in the film F1, is overlapped.

In FIG. 7, the assembly CIN is abutted on the substantially square top face of the raw article MG1 and providing, for example, a perfume vessel plug, whereas a further thermoplastics material is overmolded, for example by an injection method, on the assembly CIN.

FIG. 8 shows the finished article of manufacture MF1, for example the mentioned perfume vessel plug, the top face or surface thereof having been made integral with the lace assembly CIN embedded in the mentioned film, with a second plastics material M2 overmolded by a further injection molding process, thereby fully coating the starting article of manufacture.

Figure 9:
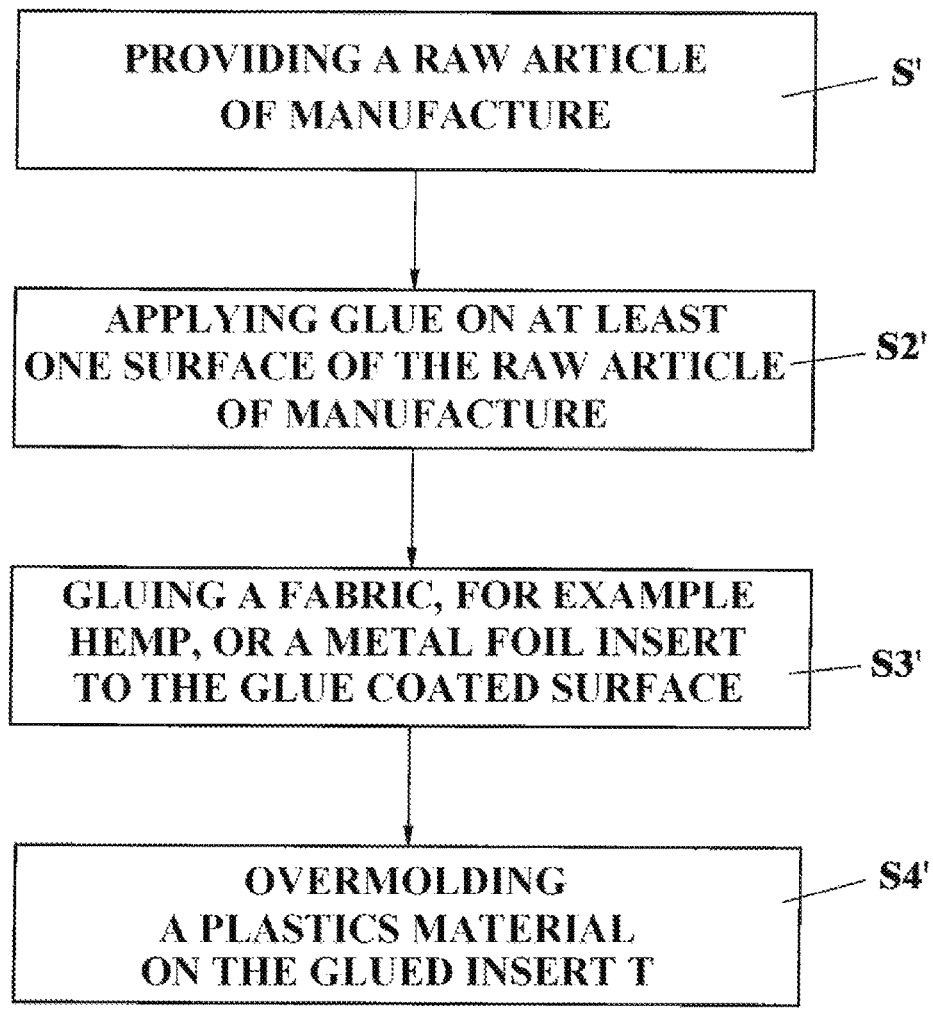
FIG. 9 is a further block diagram showing a further possible embodiment of the overmolding method according to the present invention, wherein, in the article of manufacture being overmolded, a fabric insert, for example of a hemp material, or a foil and/or metal sheet element is arranged.

FIG. 9 shows a block diagram of another embodiment of the overmolding method according to the present invention, wherein a fabric or metal insert is overmolded.

In this diagram, S1' shows a step of the method for providing a raw article of a plastics material MG2.

From the step S1', the method goes to the step S2', wherein a glue material C is applied to the top face or surface of the article MG2 (FIG. 10).

In the step S3' an insert made of a fabric or metal material T is glued to the glue material C thereby providing an assembly of raw article MG2 with a top face or surface thereof to which the insert T is glued.

In the end method step S4', to provide the finished article MG2F, on the fabric T "glued" on the top face of the raw article is overmolded a further plastics material M2', by the above mentioned injection molding process, for example, of the same plastics material forming the article or of a different material, thereby providing, as shown in FIG. 12, a finished overmolded article MG2F.

From the above disclosure it should be apparent that the invention fully achieves the intended aim and objects.

In fact, the invention has provided an overmolding method or process in which, between the first method step, that is the molding step proper, for example by injecting the plastics material "SURLYN®", and the second method step, that is the overmolding step of overmolding a further plastics material "SURLYN®", a middle method step is provided, consisting, as disclosed, of introducing lace or fabric or metal inserts.

Thus, the invention solves a great problem associated with the insert embedding step, that is embedding the insert in a very accurate manner and locking it at its desired position.

For a lace insert, the invention provides a preliminary step of feeding a very thin film, for example of a "SURLYN®" material, heating the film and applying thereon a desired lace insert, which, by contacting the hot surface of the film, will be bound or adhered to said film.

The lace is then caused to abut on the surface of the raw article and, then, the raw article with the lace insert is fully overmolded thereby providing the desired finished article of manufacture.

For a fabric or metal insert, the fabric or metal materials are at first glued to the raw article and then overmolded, without altering the color, shape or size of the embedded fabric or metal insert.

To prevent any alteration, Applicant has found that the optimum setting and adjustment of the injecting press (not shown) must be such as to prevent the mentioned risk from occurring.

Such setting and adjustment, according to the present invention, are advantageously performed by properly determining the precise distance between the outer injection point of the finished article and the inner positioning point of the insert.

Although the invention has been disclosed with reference to two preferred embodiments thereof, it should be apparent that the disclosed embodiments are susceptible to several modifications and variations, all of which will come within the scope of the invention.

In particular, the materials and shapes and size of the articles of manufacture could be any according to requirements.

The invention claimed is:

1. An overmolding method for making a plug for a perfume vessel, said method comprising the steps of:
    a) providing a first plastics material in a form suitable for an injection molding;
    b) providing a molding injection press, and molding by said injection press said first plastics material thereby providing a raw molded article of manufacture;
    c) associating with said raw article of manufacture made in said molding step:
    d) an insert element thereby providing an assembly of said raw molded article of manufacture and said insert element, said insert element being a lace fabric insert, said lace fabric insert being made by the steps of: providing a film of insert plastics material; heating said film to a softening temperature; providing a lace fabric insert element; contacting said lace fabric insert element with said heated and softened film thereby causing said film to substantially fixedly adhere to said lace fabric insert element and embedding said lace fabric insert element in said film to provide an integral assembly of said film and said lace fabric insert element; abutting said integral assembly of said film and said lace fabric insert element on a surface of said raw article of manufacture; and e) overmolding by injection overmolding on said assembly a second plastics material including fully overmolding said integral assembly of said film and said lace fabric insert element with said second plastics material thereby providing a finished molded plug for a perfume vessel, said first and second plastics materials and said insert plastics material being the same plastics material made from ethylene acid copolymers having acid groups that are partially neutralized with either zinc or sodium ions.

2. A method, according to claim 1, wherein said lace fabric insert element is made of metal.

3. A method, according to claim 1, wherein said lace fabric insert element is made of hemp.

4. A method, according to claim 1, wherein said molding injection press is an industrial molding injection press, characterized in that said method comprises the further step of adjusting said industrial molding injection press to prevent said overmolding from altering the color, shape, size or position of said integral assembly of said film and said lace fabric insert element.

5. A method, according to claim 4, wherein said adjusting step of said industrial molding injection press comprises determining a precise distance between an outer injection point of said finished article of manufacture and an inner positioning point of said integral assembly of said film and said lace fabric insert element.

\* \* \* \* \*